(12) United States Patent
Wang et al.

(10) Patent No.: US 10,851,513 B1
(45) Date of Patent: Dec. 1, 2020

(54) COMBINED OFFSHORE WIND POWER FOUNDATION WITH DUCT PILES AND A BUCKET

(71) Applicant: Tianjin University, Tianjin (CN)

(72) Inventors: Haijun Wang, Tianjin (CN); Jijian Lian, Tianjin (CN); Hao Zhao, Tianjin (CN); Xiaofeng Dong, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 16/914,731

(22) Filed: Jun. 29, 2020

(30) Foreign Application Priority Data

Jul. 1, 2019 (CN) .......................... 2019 1 0586249

(51) Int. Cl.
*E04H 12/22* (2006.01)
*E04B 1/41* (2006.01)
*E02D 27/42* (2006.01)
*E02D 27/52* (2006.01)
*E02B 17/00* (2006.01)

(52) U.S. Cl.
CPC ......... *E02D 27/425* (2013.01); *E02D 27/525* (2013.01); *E02B 2017/0073* (2013.01); *E02B 2017/0091* (2013.01); *E02D 2300/0021* (2013.01); *E02D 2300/0029* (2013.01)

(58) Field of Classification Search
CPC ................ E02D 27/425; E02D 27/525; E02D 2300/0021; E02D 2300/0029; E02B 2017/0073; E02B 2017/0091
See application file for complete search history.

(56) References Cited

U.S. PATENT DOCUMENTS

| | | | | |
|---|---|---|---|---|
| 2006/0120809 A1* | 6/2006 | Ingram et al. | .......... | E02D 27/42 405/195.1 |
| 2006/0165493 A1* | 7/2006 | Nim | ........................ | F03D 13/25 405/223.1 |
| 2011/0061321 A1* | 3/2011 | Phuly | ..................... | E02D 27/425 52/297 |
| 2015/0204101 A1* | 7/2015 | Zhao et al. | ............. | F03D 13/22 52/704 |
| 2015/0218840 A1* | 8/2015 | Paton et al. | ............ | E04H 12/10 52/651.01 |

* cited by examiner

*Primary Examiner* — Tara Mayo-Pinnock
(74) *Attorney, Agent, or Firm* — Fay Sharpe LLP

(57) ABSTRACT

The present disclosure discloses a combined offshore wind power foundation with duct piles and a bucket, which comprises duct piles and a bucket foundation; the bucket foundation includes a steel bucket skirt, a bucket top cover, main beams, ring beam and a transition section. A top of the steel bucket skirt and the bucket top cover are integrally formed into a semi-closed structure. The bucket top cover is provided thereon with main beams uniformly arranged in a circumferential direction. The ring beam are arranged at an edge of the bucket top cover. Each duct pile includes a duct, a steel pile, duct supports and high-strength mortar, each main beam is provided at its outer side end with one of corresponding. The duct support is connected with the main beam and the ring beam, and integrated with the bucket top cover, the main beams and the ring beam.

4 Claims, 1 Drawing Sheet

COMBINED OFFSHORE WIND POWER FOUNDATION WITH DUCT PILES AND A BUCKET

CROSS REFERENCE TO RELATED APPLICATION

This application claims the priority of Chinese Patent Application No. 201910586249.8 entitled "Combined Offshore Wind Power Foundation with Duct Piles and a Bucket" filed with the Chinese Patent Office on Jul. 1, 2019, which is incorporated herein by reference in its entirety.

TECHNICAL FIELD

The present disclosure relates to a field of wind energy engineering and new energy, in particular to a combined offshore wind power foundation formed by combining duct piles foundation and a bucket-shaped foundation.

BACKGROUND ART

With increasing seriousness of global energy, climate and environment and other problems, wind energy as renewable energy is highly concerned by countries all around the world. The wind energy has advantages of cleanness, low cost, inexhaustibility in supply, wide development range, large growth space in installed capacity, quick cost reduction, safe operation and the like. Compared with onshore wind power, offshore wind power has advantages of high wind speed, low turbulence degree, no farmland occupied and the like. At present, an offshore wind power foundation in China mostly adopts a pile foundation, which has a simple design and a mature installation process, but has larger horizontal deformation under the action of lateral loads (such as wind, wave and flow). The appearance of wide and shallow bucket-type foundation provides new way for the design of offshore wind turbine foundation, and the wide and shallow foundation can effectively withstand a great lateral load that offshore wind turbine may experienced, and is simple in structure, low in cost, and convenient and quick in construction.

In recent years, with the successful application of composite bucket-type foundation of offshore wind turbine and an one-step installation technology of the wind turbine, building and construction cost of offshore wind power foundation is greatly reduced, and offshore wind power foundation has a good engineering application prospect. In order to further popularize the bucket-type foundation, it is needed to enter the sea area with poor geological conditions at a bottom of the sea, which inevitably affects an operation stability of the wind turbine foundation. Currently, a direct effect brought by poor geological conditions is an increase in a diameter of the bucket-type foundation. With the increase of the diameter of the bucket, an amount of a foundation material used increases and an ability of the structure bearing a force becomes worse. Meanwhile, the existing construction equipment and construction technology can not meet the requirements, thus huge investment in equipment is needed, and the building cost of a project is obviously increased. This would impose a significant impact on the existing production process flow, impairing an economic advantage of this foundation.

At present, Chinese offshore wind power industry has applied a batch of offshore wind power bucket-type foundation structures and has corresponding building equipment. The existing building equipment requires a bucket with a diameter of no more than 38 m, and a length of a bucket skirt of the bucket is generally not more than 12 m due to a limitation from a fairway. However, with gradually increasing capacity of the existing wind turbine, an ultimate bending moment load of the wind turbine exceeds 200 MN·m, and the wind turbines needs a larger diameter of the bucket and a longer depth of the bucket skirt due to deeper water depth and worse geological conditions. The increase of the diameter of the bucket and the length of the bucket skirt leads to a significant increase of the difficulty of designing structural and the difficulty of building the structure, involving a higher engineering cost.

SUMMARY

The embodiments aim to overcome the defects in the prior art, and provides an combined offshore wind power foundation with duct piles and a bucket, which can ensure a requirement for a design of the whole wind turbine structure on inclination resistance while building cost of the foundation is reduced; and make full use of advantages of duct piles foundation and bucket foundation, so as to reduce the building cost of the offshore wind power foundation.

The purpose of the embodiments is realized by the following technical scheme.

A combined offshore wind power foundation with duct piles and a bucket comprises two parts, duct piles and a bucket-shaped foundation. The bucket-shaped foundation part includes a steel bucket skirt, a bucket top cover, main beams, ring beam and a transition section, wherein a top of the steel bucket skirt and the bucket top cover are integrally formed into a semi-closed structure with an opening facing downwardly. The bucket top cover is provided thereon with 3 to 24 main beams uniformly arranged in the circumferential direction. The ring beam is arranged around an edge of the bucket top cover, and the transition section is arranged in a middle of an upper surface of the bucket top cover.

Each duct pile includes a duct, a steel pile, duct supports and high-strength mortar. Each main beams is provided at its outer side end with one of corresponding 3-24 ducts, and an axis of the duct forms an angle of 0-15° with respect to a vertical direction. A lower opening of the duct is flush with a lower surface of the bucket top cover, and the lower opening of the duct is located at an outer side of the steel bucket skirt. The steel pile is arranged in the duct and is integrally connected with the duct through the high-strength mortar. The duct support is arranged on an outer side of the duct, connected with the main beam and the ring beam and integrated with the bucket top cover, the main beams and the ring beam.

Further, the bucket top cover, the main beams, the transition section and the ring beam all are structures of reinforced concrete and are all poured together into one piece.

Further, the transition section is a hollow circular truncated cone structure.

Further, the ducts and the duct supports are both steel structures.

Compared with the prior art, the technical scheme of the present disclosure has the following beneficial effects.

According to the combined offshore wind power foundation with duct piles and a bucket of the present disclosure, in a case that the diameter of the existing bucket-shaped foundation is not increased, an anti-tilting moment is provided through the duct piles located at the outer side of the bucket skirt of the bucket, so that the advantages of the bucket-shaped foundation and the pile foundation are embraced, meanwhile, the existing one-step installation technology and equipment for the bucket-shaped foundation and mass existing piles sinking equipment can be fully utilized, thus utilization efficiency of the equipment is improved, the engineering construction investment is reduced, reducing the cost of building the offshore wind power facilities.

Figure 1:
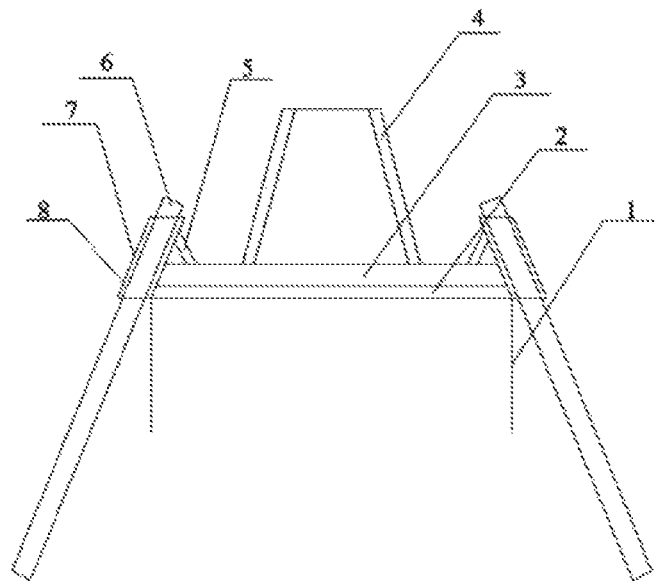
FIG. 1 is a schematic front view of a wind power foundation of the present disclosure.

List of Reference Numerals: 1—steel bucket skirt, 2—bucket top cover, 3—main beam, 4—transition section, 5—duct support, 6—steel pile, 7—duct, 8—high-strength mortar and 9—ring beam.

DETAILED DESCRIPTION OF THE EMBODIMENTS

The present disclosure is described in further details below with reference to the figures and the specific embodiments. It should be understood that the specific embodiments described herein are merely illustrative of the present disclosure and do not limit the present disclosure.

Figure 2:
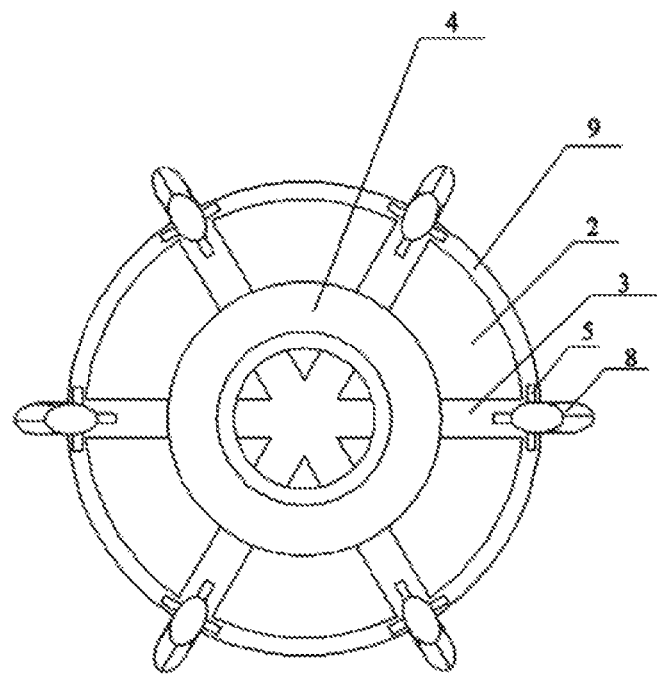
FIG. 2 is a schematic top view of the wind power foundation of the present disclosure.

As shown in FIGS. 1 and 2, the present disclosure relates to a combined offshore wind power foundation with duct piles and a bucket, which includes two parts, i.e., duct piles and a bucket-shaped foundation. The bucket foundation part includes a steel bucket skirt 1, a bucket top cover 2, main beams 3, a ring beam 9 and a transition section 4.

The steel bucket skirt 1 and the bucket top cover 2 are together formed into a semi-closed structure with an opening facing downwardly. The bucket top cover 2 is structure of a reinforced concrete, the steel bucket skirt 1 has an upper part extending into the bucket top cover 2, and the both form an integrated structure. The steel bucket skirt 1 has a wall thickness of 20 mm, a diameter of 32 m, and a height of 10 m; and the bucket top cover 2 has a diameter of 30 m, and a thickness of 40 cm.

The bucket top cover 2 is provided with 6 main beams 3 uniformly arranged in the circumferential direction, wherein each main beam is arranged in the radial direction, and the ring beam 9 arranged around an edge of the bucket top cover 2. The main beams 3 and the ring beam 9 are structures of reinforced concrete and are integrally poured with the bucket top cover 2. The main beam 3 has a height of 1 m, and a width of 0.6 m, and the ring beam 9 has a height of 1 m, and a width of 0.4 m.

The transition section 4 is arranged at a center of the bucket top cover, is a thin-wall circular truncated cone structure of reinforced concrete, and is integrally poured with the bucket top cover 2 and the main beams 3. The transition section 4 has a wall thickness of 0.5 m, a height of 20 m, a center circle with a diameter of 20 m which is located at a bottom surface of the transition section and at the middle between an outer circumferential wall and an inner circumferential wall, and a center circle with a diameter of 8 m which is located at a top surface of the transition section and at the middle between an outer circumferential wall and an inner circumferential wall.

The duct pile part includes ducts 7, steel piles 6, duct supports 5 and high-strength mortar 8.

The main beams are provided at their outer side end with 6 ducts 7, and an axis of each duct 7 and a vertical direction forms an angle of 5° toward the outer side in a radial plane of the bucket top cover 2. That is, the axis of the duct 7 is coplanar with the vertical axis through a center of the top cover 2, and an angle between both is 5°. A lower end opening of the duct 7 is flush with the a lower surface of the bucket top cover, the lower end opening of the duct 7 is located at the outer side of the steel bucket skirt 1, and the duct 7 has a wall thickness of 40 mm, and a height of 4 m.

The duct support 5 is arranged at an outside of the duct 7, the duct 7 and the duct support 5 are steel structures and are integrally connected with the main beam 3, the bucket top cover 2 and the ring beam 9 through embedded parts. The duct support 5 has a wall thickness of 30 mm.

The duct 7 is provided with a steel pile 6 therein, and the steel piles 6 and the duct 7 are integrally connected through high-strength mortar 8. The steel pile 6 has a length of 30 m, and a wall thickness of 50 mm.

The installation scheme is as follows:
(1) transporting the bucket-shaped foundation part and the duct piles part (without the steel piles 6) to an installation site, and inserting the bucket skirt of the bucket into a seabed foundation by means of pumping water or air;
(2) driving the steel piles 6 into the seabed foundation through the ducts 7, and pouring the high-strength mortar 8 into a gap between the ducts 7 and the steel piles 6 to complete the installation of the whole foundation structure.

The present disclosure is not limited to the embodiments described above. The foregoing description of the specific embodiments is intended to describe and illustrate the technical solutions of the present disclosure, and the specific embodiments described above are merely illustrative and not limitative. Those skilled in the art can make various changes in form and details which all fall within the scope of the present disclosure, in light of the disclosures herein without departing from the spirit and scope of the present disclosure as defined by the appended claims.

What is claimed is:

1. A combined offshore wind power foundation with duct piles and a bucket, comprising two parts, duct piles and a bucket-shaped foundation, the part of the bucket-shaped foundation comprises a steel bucket skirt, a bucket top cover, main beams, a ring beam and a transition section, wherein a top of the steel bucket skirt and the bucket top cover are integrally formed into a semi-closed structure with an opening facing downwardly, the bucket top cover is provided thereon with 3 to 24 main beams uniformly arranged in a circumferential direction, the ring beam are arranged around an edge of the bucket top cover, and the transition section is arranged in a middle of an upper surface of the bucket top cover;

each duct pile includes a duct, a steel pile, duct supports and high-strength mortar, each main beam is provided at its outer side end with one of corresponding 3 to 24 ducts, and an axis of the duct forms an angle of 0 to 15° with respect to a vertical direction, a lower end opening of the duct is flush with a lower surface of the bucket top cover, and the lower end opening of the duct is located at an outer side of the steel bucket skirt; the steel pile is arranged in the duct and is integrally connected with the duct through the high-strength mortar, the duct support is arranged on an outer side of the duct and connected with the main beam and the ring beam.

2. The combined offshore wind power foundation with duct piles and a bucket of claim 1, wherein the bucket top cover, the main beams, the transition section and the ring beam all are structures of reinforced concrete and are all poured together into one piece.

3. The combined offshore wind power foundation with duct piles and a bucket of claim 1, wherein the transition section is a hollow circular truncated cone structure.

4. The combined offshore wind power foundation with duct piles and a bucket of claim 1, wherein the ducts and the duct supports are all steel structures.

\* \* \* \* \*